US009841531B2

(12) United States Patent
Li et al.

(10) Patent No.: US 9,841,531 B2
(45) Date of Patent: Dec. 12, 2017

(54) THREE-DIMENSIONAL SIMULATING DEVICE FOR THE STRATUM STABILITY IN THE NATURAL HYDRATE EXPLOITATION

(71) Applicant: GUANGZHOU INSTITUTE OF ENERGY CONVERSION, CHINESE ACADEMY OF SCIENCES, Guangzhou, Guangdong Province (CN)

(72) Inventors: Xiaosen Li, Guangzhou (CN); Ningsheng Huang, Guangzhou (CN); Yu Zhang, Guangzhou (CN); Gang Li, Guangzhou (CN); Zhaoyang Chen, Guangzhou (CN)

(73) Assignee: GUANGZHOU INSTITUTE OF ENERGY CONVERSION, CHINESE ACADEMY OF SCIENCES, Guangdong (CN)

( * ) Notice: Subject to any disclaimer, the term of this patent is extended or adjusted under 35 U.S.C. 154(b) by 401 days.

(21) Appl. No.: 14/420,801

(22) PCT Filed: May 6, 2013

(86) PCT No.: PCT/CN2013/075204
§ 371 (c)(1),
(2) Date: Feb. 10, 2015

(87) PCT Pub. No.: WO2014/176794
PCT Pub. Date: Nov. 6, 2014

(65) Prior Publication Data
US 2015/0205004 A1 Jul. 23, 2015

(30) Foreign Application Priority Data

Apr. 28, 2013 (CN) .......................... 2013 1 0157506

(51) Int. Cl.
*G06G 7/48* (2006.01)
*G01V 99/00* (2009.01)
*E21B 43/00* (2006.01)

(52) U.S. Cl.
CPC ............ *G01V 99/005* (2013.01); *E21B 43/00* (2013.01)

(58) Field of Classification Search
CPC .............................. G01V 99/005; E21B 43/00
(Continued)

(56) References Cited

U.S. PATENT DOCUMENTS

| 5,434,330 | A | 7/1995 | Hnatow et al. |
| 6,055,874 | A | 5/2000 | Onan et al. |
| 2013/0030723 | A1* | 1/2013 | Gao ........................ B29C 45/77 702/50 |

FOREIGN PATENT DOCUMENTS

| CN | 101550816 A | 10/2009 |
| CN | 101761326 A | 6/2010 |

(Continued)

OTHER PUBLICATIONS

International Search Report dated Feb. 13, 2014, issued in corresponding application No. PCT/CN2013/075204.

*Primary Examiner* — Eunhee Kim
(74) *Attorney, Agent, or Firm* — Westerman, Hattori, Daniels & Adrian

(57) ABSTRACT

A three-dimensional simulating device for the stratum stability in natural gas hydrate exploitation includes a three-dimensional model located in an environmental control unit, an axial pressure control unit, and a post-processing unit. An inner cavity of the three-dimensional model is divided into a sealed simulating cavity and a sealed axial pressure sealing cavity by an axial pressure sealing piston arranged in the inner cavity. A vertical well and a horizontal well stretch into the simulating cavity. The axial pressure control unit, the (Continued)

environmental control unit, and a plurality of sensors in the three-dimensional model are electrically connected to the post-processing unit. This simulating device simulates the external environment and combines in-situ synthesis and decomposition of a hydrate with stratum stability, thereby achieving high reliability and high accuracy, comprehensively evaluating mechanical characteristic change of the stratum and the stratum stability to provide guidance in natural gas hydrate exploitation.

8 Claims, 4 Drawing Sheets

(58) Field of Classification Search
USPC ................................................ 703/10; 702/6
See application file for complete search history.

(56) References Cited

FOREIGN PATENT DOCUMENTS

| | | | | |
|---|---|---|---|---|
| CN | 101963057 | A | | 2/2011 |
| CN | 102116150 | A | * | 7/2011 |
| CN | 102162353 | A | | 8/2011 |
| CN | 102352735 | A | | 2/2012 |
| CN | 202266401 | U | * | 6/2012 |

* cited by examiner

THREE-DIMENSIONAL SIMULATING DEVICE FOR THE STRATUM STABILITY IN THE NATURAL HYDRATE EXPLOITATION

FIELD OF THE INVENTION

The present invention relates to a stratum stability simulating device, and particularly relates to a three-dimensional simulating device for the stratum stability in the natural gas hydrate exploitation.

BACKGROUND OF THE INVENTION

Natural gas hydrates (NGHs) are ice-like compounds formed by natural gas and water under specific thermodynamic conditions, and are a special form of natural gas in the nature. The investigation revealed that a large amount of NGHs are distributed in the terrestrial permafrost and the deep-sea marine sediments, wherein the total resource quantity of methane is up to $2.1*10^{16}$ m$^3$. Natural gas is a kind of clean energy resource and is favorable for environmental protection and sustainable development, so it has the practical significance in researching how to effectively exploit the natural gas hydrates.

The natural gas hydrates may exist in the nature in kinds of forms. The natural gas hydrates are solid when being buried in the ocean bed, and are changed from solid to gas when its molecular structure is changed in the exploitation process, that is to say, the hydrates are subjected to phase change in the exploitation process. Based on the characteristics of the natural gas hydrates, the exploitation method of the natural gas hydrates is different from that of the conventional energy resources. At present, most methods related to the exploitation of natural gas hydrates is to decompose the natural gas hydrates buried in the sediments at first and then transport the decomposed natural gas to the ground. At present, the general exploitation method of the natural gas hydrates is to break the temperature and pressure conditions for the its stable existence and make it to decompose. The methods mainly include the depressurization, the thermal stimulation and the chemicals injection. The decomposition of the natural gas hydrates by these methods will increase the pore pressure and liquefy the sediments in the hydrate reservoir. Meanwhile, there is no filler in the pores in sediments after the hydrates are produced. These may cause the uniform or localized compaction or localized shear of the hydrate stratum, resulting in the gradually damage and lower stabilization of the hydrate reservoir. The lowered reservoir stabilization will increase the risk for submarine landslide and large-scale collapses. Recently, the $CO_2$ replacement method has attracted great attention. Experimental researches have demonstrated the replacement of $CH_4$ in the hydrate cavities with $CO_2$, succeeded in both $CH_4$ recovery and $CO_2$ sequestration. The exchange of $CH_4$ in hydrate by $CO_2$ will also increase the stability of the reservoir sediments as well as maintain hydrates in the solid state.

Since the geological conditions, the components and the formation mechanisms of the natural gas hydrates at different regions have great discrepancy, the exploration and exploitation of the hydrate are generally guided by the experimental simulations. However, the present experimental equipments are relatively simple and difficult to satisfy the requirements of the researches on the stratum stability in the exploitation process of the natural gas hydrates. Meanwhile, there is few professional simulation laboratories which are completely used to research the stratum stability in the exploitation of the natural gas hydrates buried in the sediments. Particularly, a three-dimensional simulation research device for stratum stability in the exploitation process of the natural gas hydrates has not been reported.

SUMMARY OF THE INVENTION

Based on this, it is necessary to provide a three-dimensional simulating device for stratum stability in the natural gas hydrate exploitation to solve the technical problem that there is no three-dimensional simulation device for stratum stability research in the natural gas hydrate exploitation process in the prior art.

A three-dimensional simulating device for the stratum stability in the natural gas hydrate exploitation comprising a three-dimensional model, an axial pressure control unit, an environment control unit and a post-processing unit, an inner cavity of the three-dimensional model is divided into a sealed simulating cavity and a sealed axial pressure sealing cavity by an axial pressure sealing piston arranged in the inner cavity, a vertical well and a horizontal well which stretch into the simulating cavity are arranged in the three-dimensional model, an axial pressure injection port connected to the axial pressure sealing cavity is fixed below the three-dimensional model, and the axial pressure control unit is connected to the axial pressure injection port;
the three-dimensional model is located in the environment control unit; and a plurality of sensors are arranged in the three-dimensional model, the axial pressure control unit, the environment control unit, and the sensors are electrically connected to the post processing unit.

Further, the three-dimensional model is cylindrical and is constituted by fixing and scaling an upper flange, a cylinder and a bottom flange via a plurality of bolts; the inner part of the cylinder is the inner cavity of the three-dimensional model; the axial pressure sealing piston is arranged at the lower position of the cylinder, the enclosed space formed by the upper flange, the cylinder and the axial pressure sealing piston is the sealed simulating cavity, and the enclosed space formed by the cylinder, the bottom flange and the axial pressure sealing piston is the scaled axial pressure sealing cavity; the maximum ascending height of the axial pressure scaling piston is one fourth of the height of the three-dimensional model; and the axial pressure injection port is located in the center of the bottom flange.

Further, the liquid is injected into the axial pressure sealing cavity through the axial pressure injection port, and the liquid pushes the axial pressure sealing piston to apply an axial pressure to the simulating cavity, so as to simulate the changes of hydrate stratum structure and displacement in the simulating cavity under the condition that the axial pressure is applied; the maximum ascending height of the axial pressure sealing piston is one fourth of the height of the three-dimensional model; and the axial pressure injection port is located in the center of the bottom flange.

Further, the vertical well is connected to at least one gas-liquid inlet; after being injected into the simulating cavity through the gas-liquid inlet, the natural gas and working liquid form a hydrate stratum in the simulating cavity; there are three detection layers at different depths along the vertical direction; there is one group of vertical well stretching into the simulating cavity, and the vertical well is arranged in the center of the simulating cavity; the vertical well consists of three vertical well pipes which stretch into the three detection layers in the simulating cavity respectively; there is one group of horizontal well in the simulating cavity, and the horizontal well is arranged on the middle detection layer and consists of a horizontal well pipe.

Further, the vertical well and the horizontal well are connected to the three-dimensional model through the detachable thread coupling.

Further, the sensors in the three-dimensional model include thermometers and position transducers, and the simulating cavity is quartered by the three detection layers; 25 thermometers and 25 position transducers are arranged on the plane of each detection layers respectively; the thermometers and the position transducers on the plane of each detection layers are distributed squarely, and the thermometers and the position transducers at four corners of the square are tightly attached to the inner wall of the simulating cavity; and the thermometers and the position transducers are arranged in the simulating cavity, and are electrically connected to the post-processing unit through the leads.

Further, the axial pressure control unit comprises an axial pressure pump and a servo overflow valve which are sequentially connected to each other, the servo overflow valve is connected to the axial pressure injection port through a pipeline, a pressure sensor for measuring the pressure of the axial pressure sealing cavity is connected to the axial pressure injection port, and the pressure sensor is connected to the post processing unit.

The three-dimensional simulating device for the stratum stability in the natural gas hydrate exploitation in the present invention can be used to investigate the mechanical parameter changes of hydrate-containing sediments in the natural gas hydrate accumulation and exploitation processes under the condition of different sediments, hydrate saturation degrees and coverage, including the hydrate reservoir structure change caused by hydrate decomposition and the mechanical parameter changes of the hydrate reservoir caused by the gas and water releases of hydrate decomposition thus comprehensively evaluating the risk control in the hydrate exploitation process.

According to three-dimensional simulating device for the stratum stability in the natural gas hydrate exploitation in the present invention, the sensors in the three-dimensional model, the axial pressure control unit and the environment control unit are electrically connected to one another through the post-processing unit, and acquire corresponding parameters such as the pressure, temperature and displacement.

A data processing module may be data processing software the data processing module processes the signals of the sensors to acquire a time-temperature curve, a time-pressure curve, a time-displacement curve, a time-flow curve and a pressure-displacement curve to analyze the conditions of the stratum stability. The post-processing unit can measure and continuously monitor the parameters such as temperature, pressure, displacement and liquid weight on line.

In conclusion, the present invention has the advantages:

1) The hydrate stratum change features in multiple different exploitation methods can be simulated through the simulating device;

2) During the simulation experiments, by using the multiple-measuring-point and three-dimensional monitoring, the simulation research on strata characteristic changes at the position with the different space distances from a production well can be performed;

3) The three-dimensional model can simultaneously simulate the stability of hydrate strata in the exploitation process using the vertical well and the horizontal well;

4) The simulating device of the present invention can truly simulate the external environment and combine the investigates of the hydrate stratum stability in the in-situ hydrate synthesis and hydrate exploitation, thereby achieving the high reliability and high accuracy, and comprehensively evaluating the changes of the stratum mechanics and the stratum stability in the exploitation process to provide guidance to the natural gas hydrate exploitation.

REFERENCE SIGNS

1—three-dimensional model, 2—temperature control chamber, 3—simulating cavity, 4—thermostatic water bath, 5—gas-liquid inlet, 6—gas-liquid outlet, 7—pressure sensor, 8—thermometers, 9—position transducers, 10—data acquisition box. 11—computer, 12—axial pressure pump, 13—cylinder, 14—upper flange, 15—bottom flange, 16—bolt, 17—water jacket, 18—water jacket inlet, 19—water jacket outlet 20—vertical well, 21—horizontal well, 22—hydrate stratum, 23—axial pressure piston, 24—axial pressure injection port, 25—axial pressure sealing cavity, and 26—servo overflow valve.

DETAILED DESCRIPTION OF THE EMBODIMENTS

The present invention will be further described in detail below in combination with the accompanying drawings and specific embodiments.

A three-dimensional simulating device for the stratum stability in the natural gas hydrate exploitation in the present invention can be used to investigate the mechanical parameter changes of hydrate-containing sediments in the natural gas hydrate accumulation and exploitation process under the condition of different sediment characteristics, hydrate saturation degrees and coverage characteristics. The investigation include the hydrate reservoir structure change caused by hydrate decomposition, the mechanics changes of the hydrate reservoir caused by the gas and water releases of hydrate decomposition, and the comprehensively evaluations of the risk control in the hydrate exploitation process.

Figure 1:
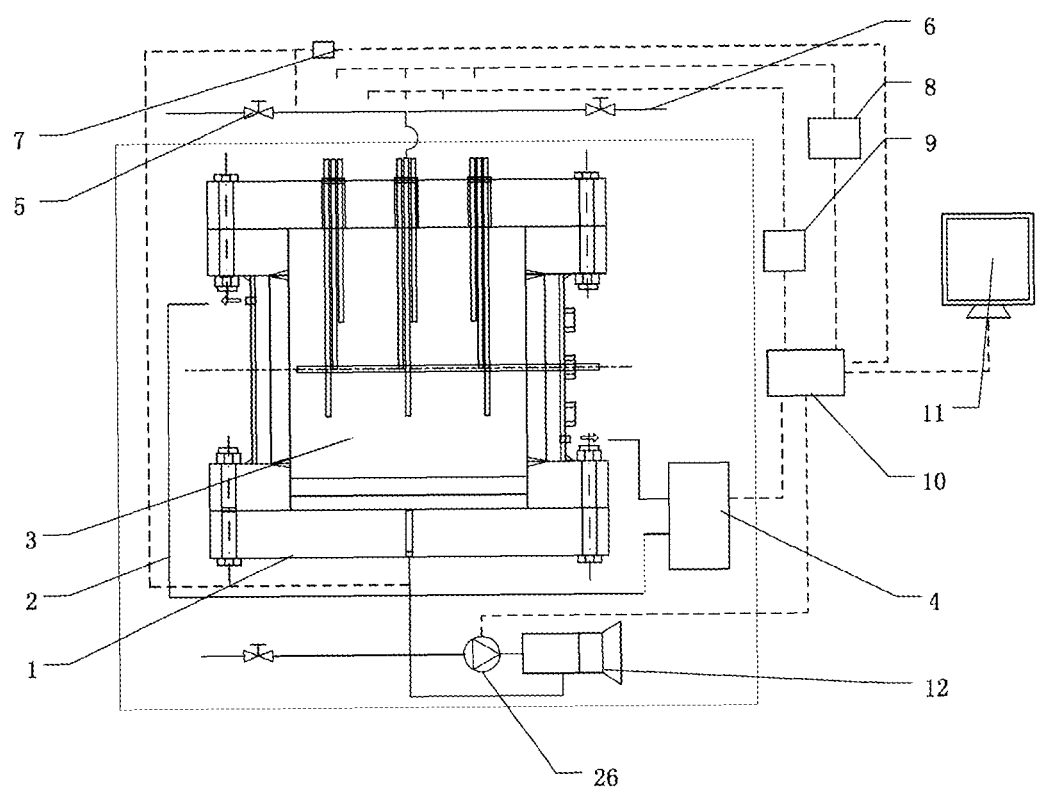
FIG. 1 is a structural schematic diagram of an embodiment of the present invention.
Figure 2:
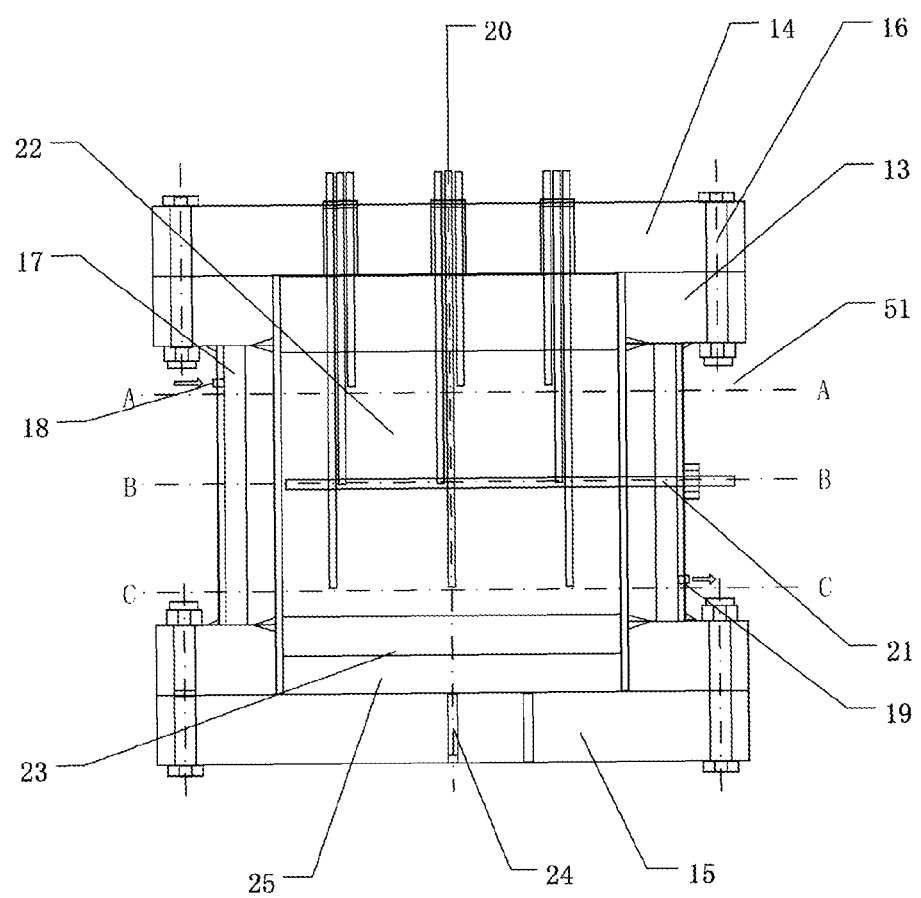
FIG. 2 is a schematic diagram of a sectional structure of a three-dimensional model in the embodiment of the present invention.
Figure 3:
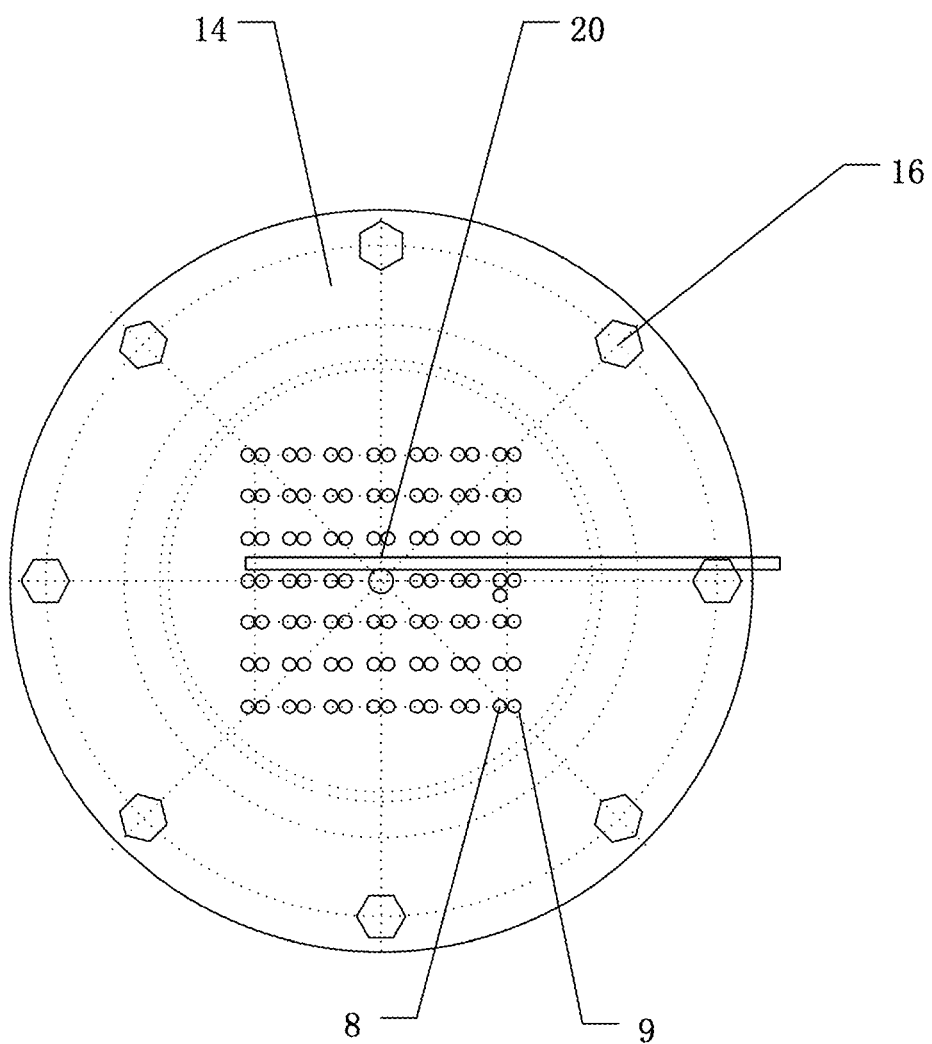
FIG. 3 is a schematic diagram of a top-view structure of the three-dimensional model in the embodiment of the present invention.
Figure 4:
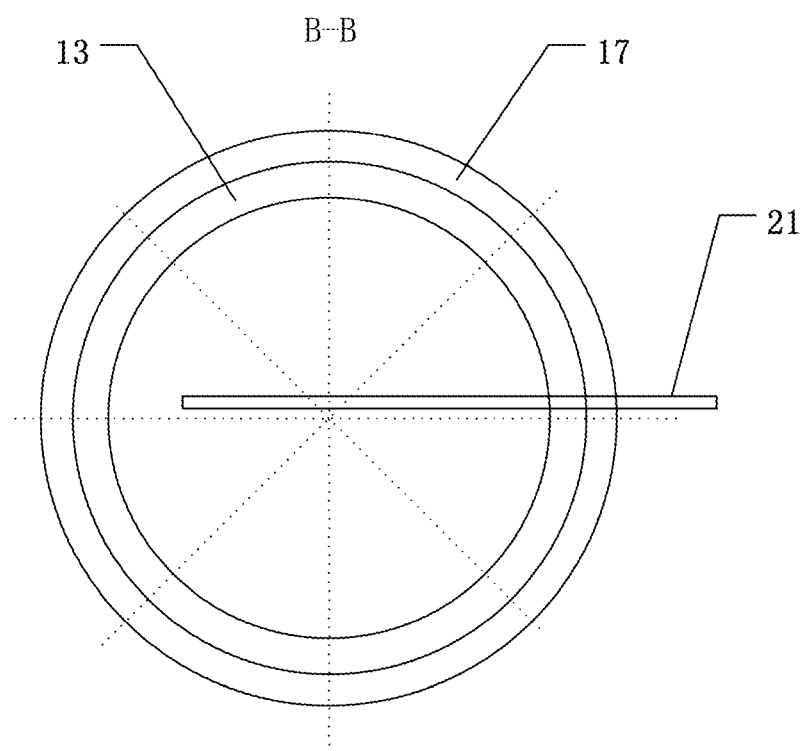
FIG. 4 is a schematic diagram of the sectional structure in the B-B direction in FIG. 2.

With reference to FIG. 1 to FIG. 4, a three-dimensional simulating device for the stratum stability in the natural gas hydrate exploitation comprises a three-dimensional model 1, an axial pressure control unit, an environment control unit and a post-processing unit. The inner part of the three-dimensional model 1 is a sealed simulating cavity 3 and a sealed axial pressure sealing cavity 25, a group of vertical well 20 and a group of horizontal well 21 are arranged in the three-dimensional model 1. The simulating cavity 3 is connected to a gas-liquid inlet 5 and a gas-liquid outlet 6 through the vertical well. A pressure sensor 7 for measuring the pressure in the simulating cavity 3 is arranged on the gas-liquid inlet 5. The three-dimensional model 1 is located in the environment control unit; and a plurality of sensors are arranged in the three-dimensional model 1. The axial pressure control unit and the environment control unit, and the sensors are electrically connected to the post-processing unit. The three-dimensional model 1 is a cylindrical stainless steel reactor, constituted by a cylinder 13, an upper flange 14 and a bottom flange 15. The cylinder 13, the upper flange 14 and the bottom flange 15 are connected to each other through bolts 16. An axial pressure piston 23 is arranged at the bottom of the cylinder 13. The enclosed space formed by the upper flange 14, the cylinder 13 and the axial pressure sealing piston 23 is the sealed simulating cavity, and the enclosed space formed by the cylinder 13, the bottom flange 15 and the axial pressure sealing piston 23 is the sealed axial pressure sealing cavity. The maximum ascending height of the axial pressure sealing piston 23 is one fourth of the height of the three-dimensional model, to avoid the damage of the sensors in the simulating cavity by the contact with the axial pressure sealing piston. An axial pressure injection port 24 is located in the center of the bottom flange 15 and connected to an axial pressure pump 12. To accurately control the temperature of the three-dimensional model 1, a water jacket 17 is arranged on the outer side of the cylinder 13, and the water jacket is connected to a thermostatic water bath 4 through a water jacket inlet 18 and a water jacket outlet 19. In the simulating cavity 3 is a hydrate stratum 22. The hydrate stratum 22 in the simulating cavity is divided into three detection layers, respectively an upper detection layer, a middle detection layer and a lower detection layer (respectively corresponding to A-A sectional position. B-B sectional position and C-C sectional position in FIG. 2), and the simulating cavity is quartered by the three detection layers. 25 thermometers and 25 position transducers distributed uniformly are arranged on the upper flange 14. The vertical well 20 is arranged in the center of the upper flange 14 and consists of three well pipes stretching into different depths of the simulating cavity 3, and the well pipes stretch into the three detection stratus (respectively corresponding to the A-A sectional position, the B-B sectional position and the C-C sectional position in FIG. 2) from the upper flange. A group of horizontal well 21 is arranged on the side wall of the cylinder 13. The horizontal well 21 stretches into the simulating cavity 3 (the stretching position responds to the B-B sectional position in FIG. 2) from the side wall, and penetrates through the hydrate stratum 22 along the radial direction. The vertical well 20 and the horizontal well 21 are connected to the three-dimensional model 1 through the detachable thread coupling respectively. When an axial pressure is applied on the simulating cavity 3, the well pipes of the vertical well 20 and the horizontal well 21 can be detached, to prevent the damage. Both the vertical well 20 and the horizontal well 21 are connected to the outside through the control valves.

Thermometers and position transducers are arranged on three layers in the simulating cavity 3 along the vertical direction of the hydrate stratum 22, and 5*5=25 thermometers and position transducers are uniformly arranged on each layer; the thermometers and position transducers on the plane of each detection layer are distributed squarely, and the thermometers and position transducers at four corners of the square are tightly attached to the inner wall of the simulating cavity; thermometers 8 and position transducers 9 can measure the temperature and displacement in the three-dimensional model, respectively, and the measurement data can be recored by a data processing unit for analyzing.

Liquid with certain pressure is injected into the axial pressure sealing cavity 25 through the axial pressure injection port 24, and pushes the axial pressure sealing piston 23 to apply an axial pressure to the simulating cavity 3, so as to simulate changes of hydrate stratum structure and displacement in the simulating cavity 3 under the condition that the axial pressure is applied.

The environment control unit includes a temperature control chamber 2 for accommodating the three-dimensional model 1 and a water jacket 17 arranged on the outer wall of the three-dimensional model 1 and connected to the thermostatic water bath 4. The sensors on the environment control unit at least include temperature sensors arranged in the temperature control chamber 2 and the water of the thermostatic water bath 4. The temperature of the three-dimensional model 1 can be accurately controlled through the environment control unit.

The axial pressure control unit includes the axial pressure pump 12 and a servo overflow valve 26 which are sequentially connected to each other, and is connected to the axial pressure injection port 24 on the bottom flange 15 through a pipeline. A pressure sensor for measuring the pressure of the axial pressure sealing cavity 25 is connected to the axial pressure injection port 24, the real-time pressure measured by the sensor is sent to a computer 11 through a data acquisition box 10, and the computer 11 controls the open and close of the servo overflow valve 26, to stabilize and adjust the axial pressure.

The post-processing unit includes the data acquisition box 10 and the computer 11 which are connected to each other. A data acquisition module, a data processing module and a data storage module are arranged in the computer 11. The data acquisition box 10 is connected to the computer 1. The data acquisition module is used to record the parameters such as pressure, temperature and displacement measured by the sensors. The data processing module could be data processing software or other structure, and is used to process the signals of the sensors to acquire a time-pressure curve, a time-temperature curve, a time-displacement curve and analyze the conditions of the stratum stability. The parameters such as temperature, pressure and displacement can be all continuously monitored on line.

In the present invention, the environment control unit is used to control the environment temperature of the three-dimensional model 1; the axial pressure control unit is used to applied the axial pressure to the hydrate stratum in the three-dimensional model 1; the post-processing unit is used to record and processing the signals of the sensors, and the signal acquisition of the sensors generally includes the temperature, pressure and displacement in the simulating cavity and the pressure value of the axial pressure sealing cavity; the data processing of the sensors generally includes the output of the time-temperature curve, the time-pressure curve, the time-displacement curve, which are used to comprehensively evaluate the experimental data.

The pressure tolerance range of the three-dimensional model is generally 5-40 MPa, the volume of the inner cavity of the three-dimensional model is 50-500 L, and the three-dimensional model is a cylindrical stainless steel reactor; and the pressure tolerance range is preferably 25±2.5 MPa, the volume of the inner cavity is preferably 110±20 L, and the length of the three-dimensional inner cavity should be more than 500 mm. The temperature measuring interfaces, the pressure measuring interfaces and the displacement measuring interfaces of the three-dimensional model 1 should be increased as the volume of the three-dimensional model increases, and the installation positions of the interfaces should ensure that temperature, pressure and displacement monitoring points are uniformly distributed in the space of the three-dimensional model.

Merely a few implementations of the present invention are described in the above embodiment specifically in detail, and should not be understood as limiting the scope of the present invention patent. It should be pointed out that, various variations and improvements may also be made for those of ordinary skill in the art without departing from the conception of the present invention, and these variations and improvements belong to the protection scope of the present invention. Accordingly, the protection scope of the appended claims should prevail over the protection scope of the present invention patent.

The invention claimed is:

1. A simulating device for simulating stratum stability in natural gas hydrate exploitation, comprising:
   an environment control unit;
   a model located within the environmental control unit, the model comprising
     an inner cavity which is divided into a sealed physical simulating cavity and a sealed axial pressure sealing cavity by an axial pressure sealing piston,
     a plurality of sensors,
     a vertical well which stretches into the sealed physical simulating cavity, and
     a horizontal well which stretches into the sealed physical simulating cavity;
   an axial pressure injection port fixed below the model and connected to the sealed axial pressure sealing cavity;
   an axial pressure control unit connected to the axial pressure injection port;
   a post-processing unit; and
   wherein the axial pressure control unit, the environment control unit, and the sensors are electrically connected to the post-processing unit.

2. The simulating device according to claim 1,
   wherein the model is cylindrical and includes an upper flange, a cylinder and a bottom flange fixed and sealed via a plurality of bolts,
   wherein an inner part of the cylinder defines an inner cavity of the model,
   wherein the axial pressure sealing piston is arranged at a lower position of the cylinder,
   wherein the sealed physical simulating cavity is an enclosed space formed by the upper flange, the cylinder and the axial pressure sealing piston, and
   wherein the sealed axial pressure sealing cavity is an enclosed space formed by the cylinder, the bottom flange and the axial pressure sealing piston.

3. The simulating device according to claim 2,
   wherein the simulating device is configured such that liquid is injected into the axial pressure sealing cavity through the axial pressure injection port, such that the liquid pushes the axial pressure sealing piston to apply an axial pressure to the physical simulating cavity and simulate changes of structure and displacement of hydrate stratum in the physical simulating cavity,
   wherein a maximum ascending height of the axial pressure sealing piston is one fourth of a height of the model, and
   wherein the axial pressure injection port is located in a center of the bottom flange.

4. The simulating device according to claim 1,
   wherein the vertical well is connected to at least one gas-liquid inlet and is arranged in a center of the physical simulating cavity, the vertical well including three vertical well pipes which stretch into three detection layers at different depths along the vertical direction in the physical simulating cavity respectively,
   wherein after being injected into the physical simulating cavity through the gas-liquid inlet, natural gas and working liquid forms hydrate stratum in the physical simulating cavity, and
   wherein the horizontal well includes a horizontal well pipe arranged in a middle detection layer of the physical simulating cavity.

5. The simulating device according to claim 4, wherein the vertical well and the horizontal well are connected to the model through a detachable thread coupling.

6. The simulating device according to claim 4,
   wherein the sensors in the model comprise thermometers and position transducers for measuring the temperature and displacement changes at different positions of the hydrate stratum in the physical simulating cavity, respectively,
   wherein twenty-five thermometers and twenty-five position transducers are arranged in each detection layer respectively,
   wherein the thermometers and position transducers in each detection layer are distributed so as to collectively form a square shape in plan view,
   wherein the thermometers and position transducers at four corners of the square shape are tightly attached to the inner wall of the physical simulating cavity, and
   wherein the thermometers and position transducers are arranged in the physical simulating cavity, and are electrically connected to the post-processing unit.

7. The simulating device according to claim 1,
   wherein the axial pressure control unit comprises an axial pressure pump and a servo overflow valve which are sequentially connected to each other, the servo overflow valve being connected to the axial pressure injection port through a pipeline, and
   wherein the simulating device further comprises a pressure sensor measuring a pressure of the axial pressure sealing cavity, the pressure sensor being connected to the axial pressure injection port and connected to the post-processing unit.

8. The simulating device according to claim 2,
   wherein the vertical well is connected to at least one gas-liquid inlet and is arranged in a center of the physical simulating cavity, the vertical well including three vertical well pipes which stretch into three detection layers at different depths along the vertical direction in the physical simulating cavity respectively,
   wherein after being injected into the physical simulating cavity through the gas-liquid inlet, natural gas and working liquid forms hydrate stratum in the physical simulating cavity,
   wherein the horizontal well includes a horizontal well pipe arranged in a middle detection layer of the physical simulating cavity.

* * * * *